Sept. 5, 1967 A. BENZ 3,339,524
APPARATUS FOR GLAZING CAKES
Filed Oct. 22, 1965 4 Sheets-Sheet 2

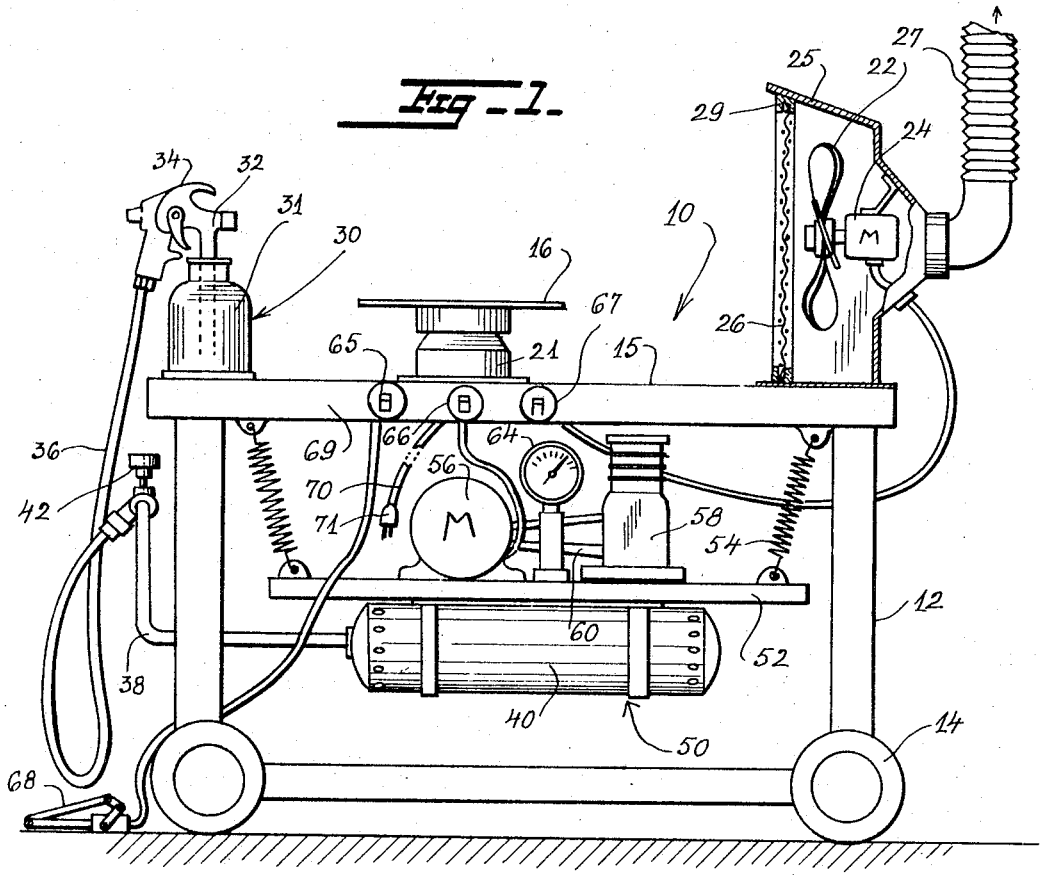
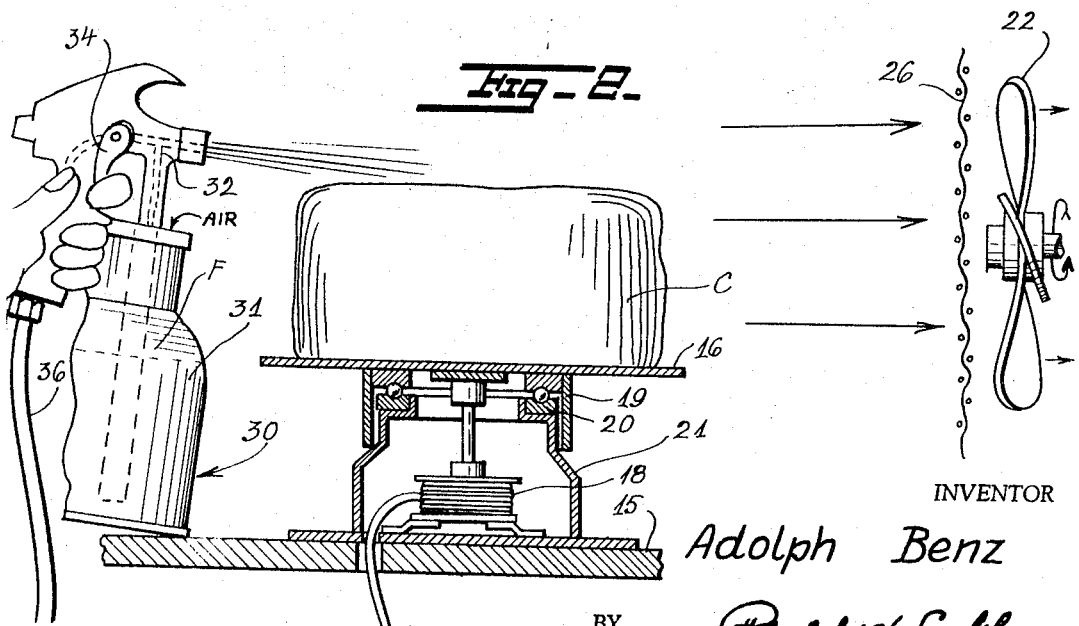

INVENTOR
Adolph Benz
BY Polachek & Saulsbury
ATTORNEYS

Sept. 5, 1967  A. BENZ  3,339,524
APPARATUS FOR GLAZING CAKES
Filed Oct. 22, 1965  4 Sheets-Sheet 3
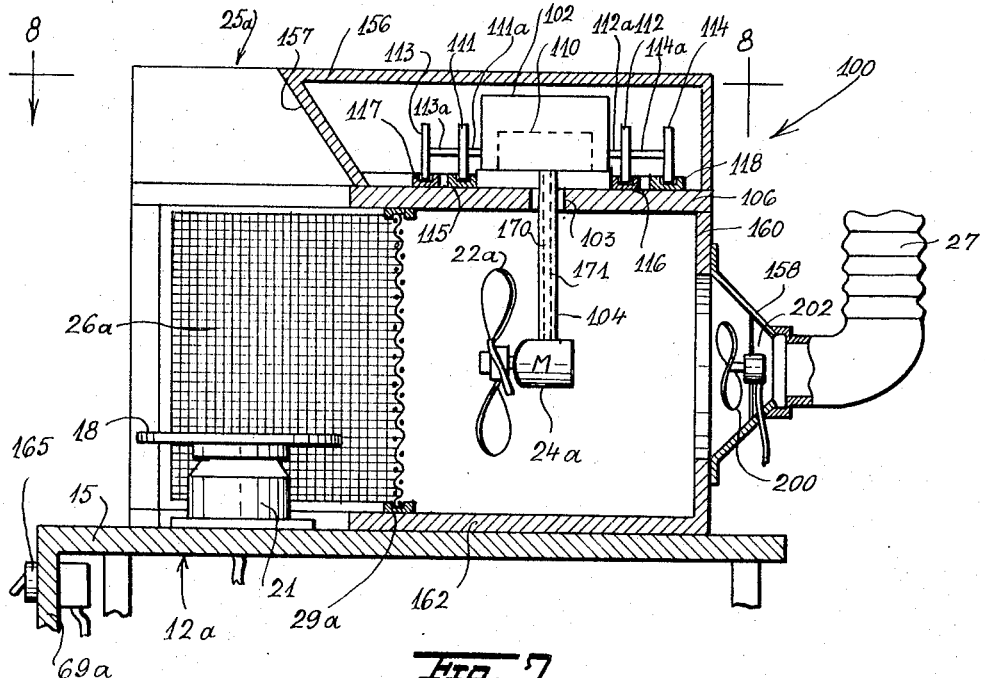
Fig-7-
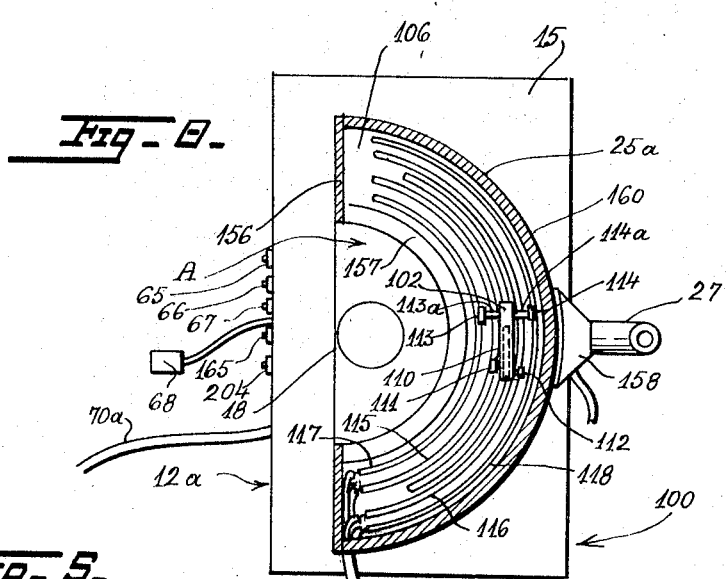
Fig-8-
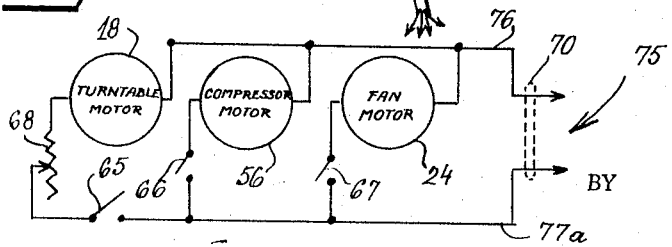
Fig-5-
INVENTOR
Adolph Benz
BY Polachek & Saulsbury
ATTORNEYS INVENTOR
Adolph Benz

United States Patent Office 3,339,524
Patented Sept. 5, 1967

3,339,524
APPARATUS FOR GLAZING CAKES
Adolph Benz, 1808 W. Fredonia Ave.,
Peoria, Ill. 61606
Filed Oct. 22, 1965, Ser. No. 500,781
10 Claims. (Cl. 118—24)

This invention concerns an apparatus for applying a glaze to a cake in tiers or single layers or to ornamental parts of cakes. The invention is intended for treatment of elaborate or simple wedding cakes.

According to the invention a liquid mixture of ingredients of proper thin consistency is contained in a manually controllable spray gun or sprayer operated by compressed air. The cake to be treated is mounted on an electrically driven turntable. Behind the turntable is a hood containing an exhaust fan. The hood is vented to the outside atmosphere. The hood and turntable are mounted on an easily maneuverable table on which are electrical switches and other parts pertaining to the apparatus. Under the table is a spring mounted air compressor connected to the sprayer. In a modified form of the invention, the hood partially surrounds the turntable and the fan is movable by a trolley under control of the operator of the apparatus.

It is therefore one object of the invention to provide a novel means of applying a glaze to a wedding cake or part thereof by spraying a glazing substance thereon.

A further object is to provide in combination apparatus for spraying a glaze on a cake, including a spray gun, turntable support for the cake, an exhaust fan in a vented hood for collecting and dissipating excess spray and fumes, and an air compressor.

Another object is to provide apparatus as described, wherein the exhaust fan is movable in the hood by a trolley under control of an operator of the apparatus.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side elevational view of apparatus embodying the invention.

FIG. 2 is an enlarged side view of parts of the apparatus shown in use.

FIG. 5 is a diagram of an electrical circuit employed in the apparatus.

FIG. 7 is an enlarged vertical cross sectional view taken on line 7—7 of FIG. 6.

FIG. 8 is a reduced horizontal sectional view taken on line 8—8 of FIG. 7.

Figure 3:
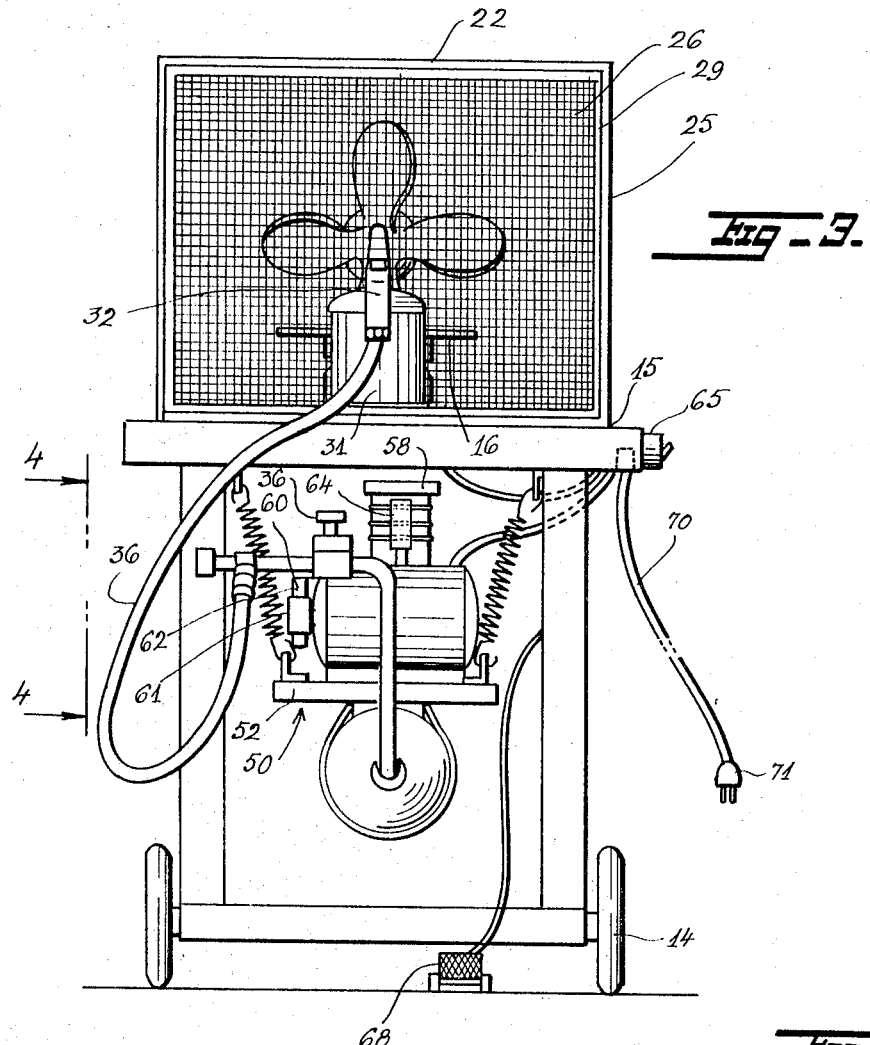
FIG. 3 is an end elevational view of the apparatus of FIG. 1.
Figure 4:
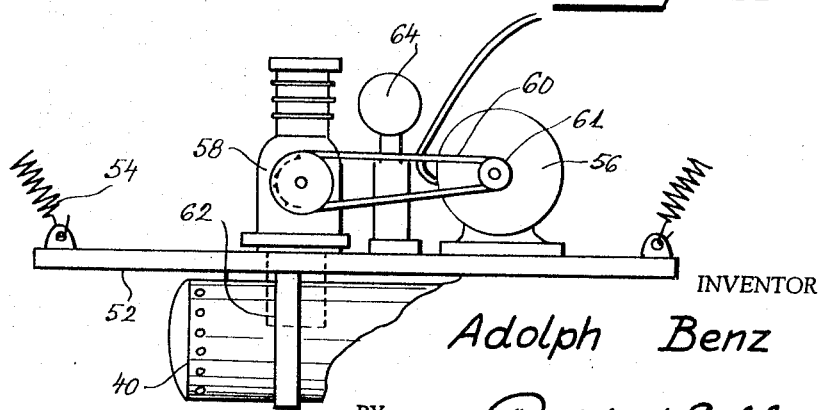
FIG. 4 is a fragmentary rear elevational view taken on line 4—4 of FIG. 3.

Referring first to FIGS. 1–4, there is shown apparatus 10 embodying the invention. The apparatus includes a table 12 mounted on large wheels or casters 14 so that the table is readily movable to any working area where convenient. On the horizontal table top 15 is a horizontal turntable 16 rotated by a motor 18. The turntable turns on ball bearings 19 in a race 20 carried by base 21 surrounding and supporting the motor 18.

Aligned with and facing the turntable is an axially horizontal exhaust fan 22 driven by a motor 24 mounted with the fan in a tapered hood 25. The hood has an open front in which is a replaceable vertical screen filter 26 held in a frame 29. The filter passes air and fumes while tending to retain fluid contained in a spray directed toward the turntable. A flexible hose 27 is connected to the rear of the hood to vent fumes to the outside atmosphere.

The apparatus further includes a sprayer 30 including a container 31 in which is fluid F of proper consistency or viscosity for spraying. The sprayer has an atomizer gun 32 attached to the container 31. The gun is manually controlled by means of a trigger 34 operating on an air valve in the gun. Connected to the gun is a flexible pipe or hose 36. The hose 36 is connected to pipe 38 at the outlet of a compressed air tank 40. A control valve 42 is provided in pipe 38.

The tank 40 is part of a compressor assembly 50 mounted on a rectangular platform 52 under the table top. Four springs 54 are connected between corners of the platform and the underside of the table top so that the compressor has a floating mounting. On the platform 52 is a motor 56 driving an air compressor 58 via an endless belt 60, motor drive pulley 61 and compressor pulley 63. The compressor is connected to tank 40 through a connecting pipe 62 which passes through a hole in the platform. A pressure gauge 64 on the platform is connected to the tank through another hole in the platform and indicates the pressure inside the tank.

On the front rail 69 of the table are switches 65, 66 and 67. Switch 65 is connected in circuit with a foot operated rheostat 68 and the turntable motor 18. Switch 66 is connected in circuit with motor 56. Switch 67 is connected in circuit with motor 24. All switches and motors are connected in circuit with a power supply cord 70 terminating in a plug 71 which can be inserted into a suitable power supply outlet.

FIG. 5 shows circuit 75 in which power supply cord 70 has one wire 76 connected to one terminal of each of motors 18, 24 and 56. The other power supply wire 77 is connected to one contact of each of the three switches 65, 66 and 67. Switch 65 is connected in series with the rheostat 68 to motor 18. Switches 66 and 67 are connected directly to the motors 56 and 24 respectively.

In operation of apparatus 10, a cake C as shown in FIG. 2 may be mounted on the turntable 16 and will be rotated when switch 65 is closed. The container 31 of the sprayer will contain an edible gum solution or mixture with such coloring matter as may be desired. Egg albumen may be added to impart a glaze. Other known glues, gums or substances may be used as pearlising or glazing media. The fluid F will be a free flowing liquid which sprays readily and dries rapidly.

As the turntable is rotated at any speed determined by the pedal pressure applied to the treadle or foot rheostat 68, the trigger of the spray gun can be operated to spray cake C rotating on the turntable. Excess drops of the liquid solution or mixture will collect on the screen filter 26. The air blast and fumes will be drawn off by the exhaust fan. The filter 26 can be washed and replaced when necessary.

The apparatus makes possible high speed, uniform application of glaze to cakes or parts thereof. No particular skill is needed. The exhaust fan can be turned on and off by means of switch 67. The compressor motor can be controlled by operation of switch 66. The turntable is controlled by switch 65 and rheostat 68.

Figure 6:
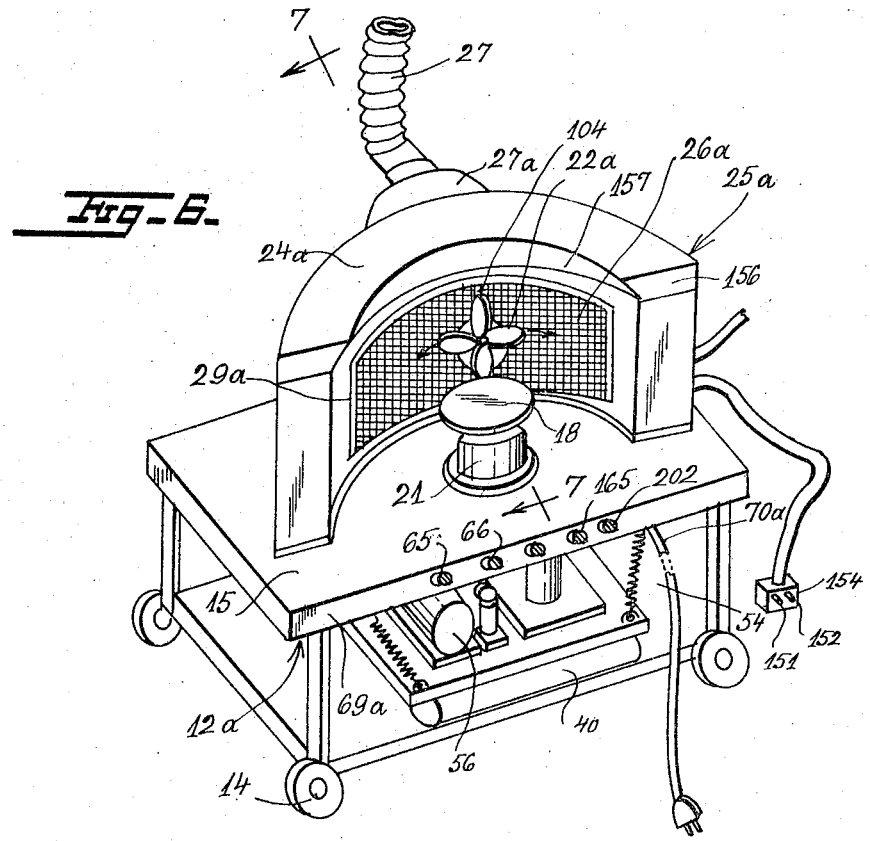
FIG. 6 is a perspective view of another assembly or apparatus embodying a modification of the invention.

In FIGS. 6–8 is shown another apparatus 100 for applying glaze to cake and parts thereof. The apparatus is generally similar to apparatus 10 and corresponding parts are identically numbered. In apparatus 100, the exhaust fan 22a is movably mounted in a semicylindrical hood 25a. The fan is driven by motor 24a which is carried by a motor driven trolley 102. A hollow shaft 104 connects the motor 24a to the trolley. The shaft extends through an arcuate, circularly curved slot 103 formed in a horizontal partition 106 in the hood. This partition is an annular arcuate member made of wood or other electrical insulation material. The trolley 102 contains a drive motor 110. The trolley has four metal, electrically conductive wheels 111–114. The wheels are electrically insulated from each other. The wheels of the trolley ride in semicircular channel shaped metal rails 115–118 respectively. These rails are connected via a power cord or cable 120 in electric circuit 150 which is explained below in connection with FIG. 9. Wheels 111, 112 on shafts 111a, 112a are closer together and ride in rails 115, 116. Wheels 113, 114 on shafts 113a, 114a are spaced further apart and ride in rails 117, 118.

The rails 115–118 are concentric with each other and guide the trolley to move in a semicircular path in one direction or another under control of a rheostat 151 and reversing switch 152 contained in a switch box 154. Motor 110 rotates only wheels 111, 112. Wheels 113, 114 are not connected to the motor. A cylindrically curved screen filter 26a is removably mounted in the open front of hood 25a in frame 29a. A removable cover 156 with forwardly inclined front wall 157 is mounted on top of the hood. The exhaust conduit 27 is attached to a conical duct 158 opening into the hood at the semicylindrical back wall 160 of the hood. The back wall 160 is integrally joined to flat semiannular base 162 of the hood.

The turntable 18 is located on table 12a inside the semicircular area A defined by the semicylindrical hood. Operation of the turntable is under control of foot rheostat 68 and switch 65 as previously explained. The movable fan is under control of on-off switch 67. An additional switch 165 is provided on the front rail 69a of the table for turning the trolley motor on and off.

Figure 9:
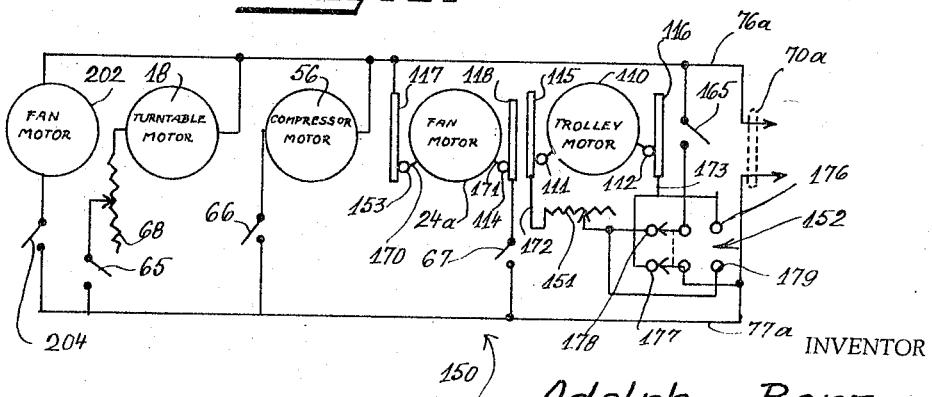
FIG. 9 is a diagram of an electric circuit employed in the apparatus of FIGS. 6–8.

The electric circuit 150 of apparatus 100 is shown in FIG. 9 to which reference is now made. This circuit is similar to circuit 75 and corresponding parts are identically numbered. The outer rails 117 and 118 are electrically connected to fan motor 24a via wheels 113, 114 and wires 170, 171 which run through the hollow supporting shaft 104. The inner rails 115 and 116 are electrically connected to rheostat 151 and reversing switch 152 respectively, via wires 172, 173. The power supply cord 70a has one wire 76a connected to motors 18 and 56 and to pole 175 of the reversing switch 152. Rail 116 is connected to alternate fixed contacts 176, 177 of the switch. Rail 115 is connected to alternate fixed contacts 178, 179 of the switch via rheostat 151. Switch 152 is double-pole double throw switch. The switch 152 and rheostat 151 are conveniently available at the switch box 154 which the operator of the device holds in one hand while operating the spray gun 30 with the other hand. Pole 181 of the switch is connected to power supply wire 77a which is also connected to switches 65, 66, 67.

In operation of apparatus 100 and circuit 150, it will be apparent that each of the motors can be turned on and off by means of switches 65–67 and 165. The fan can be driven in a semicircular path in a horizontal plane in one direction or another by operation of reversing switch 152. The speed of travel of the trolley carrying the fan will be determined by the manual setting and control of rheostat 151.

Apparatus 100 has the advantage that the operator can move the sprayer around while the turntable 18 is rotating or is stationary and the fan 22a will always be located in the direct line of fire of the sprayer 30 so that most effective exhaust action is obtained. A supplementary exhaust fan 200 can be installed in the exhaust duct 158. This fan will have its motor 202 connected in the circuit 150 to wires 76a, 77a, as shown and will be controlled by on-off switch 204 on the rail 69a of the table.

In both forms of the invention described, there has been provided means for mechanising the application of glaze to cakes. Heretofore this has also been a slow, tedious operation, wasteful of time, labor and material. With the present invention, a thin, highly glossy glaze can be rapidly imparted to a cake in an effective and satisfactory manner.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. Apparatus for applying a glaze to a cake, comprising a horizontal table, a horizontal turntable mounted on said table for mounting a cake thereon, a first motor rotating said turntable, a manually operable spray gun having a container for a liquid glaze to be applied to the cake while the turntable is rotating, an air compressor assembly, spring means supporting the compressor assembly under the table in a floating mounting; said assembly including a tank for containing air under pressure, an air compressor connected to the tank to charge the same with air under pressure, a pipe connecting said tank and sprayer, a second motor driving the compressor; an exhaust fan, a hood on the table, said fan being mounted in the hood for drawing fumes away from the turntable, said hood having an open front and closed back, an exhaust conduit connected to the back of the hood for exhausting said fumes to outside atmosphere, a screen filter in the open front of the hood to catch fluid drops from said spray, a third motor in the hood driving the fan, and a power supply circuit connected to the three motors and energizing the same for rotating the turntable, driving the compressor and driving the exhaust fan respectively and simultaneously.

2. Apparatus as recited in claim 1, wherein said compressor assembly includes a rectangular supporting platform, said spring means comprising springs at corners of the platform connected to the underside of the table.

3. Apparatus as recited in claimed 1, further comprising switches connected respectively in series circuit with the motors respectively for turning the same on and off, and a foot operated rheostat connected in series with said first motor for controlling the speed of rotation of the turntable while said spray gun is applying a glazing spray to said cake on the turn table.

4. Apparatus as recited in claim 1, further comprising trolley means in the hood movably carrying said exhaust fan and third motor, a fourth motor in the trolley driving the same in a horizontal path, a reversing switch, and another rheostat, said other rheostat and reversing switch being connected in circuit with fourth motor and respectively controlling the direction and speed of travel of the trolley.

5. Apparatus as recited in claim 1, further comprising another exhaust fan in said duct cooperating with the first named exhaust fan to exhaust said fumes, said other exhaust fan having a further motor connected in said circuit to draw electrical energy therefrom.

6. Apparatus as recited in claim 1, wherein said hood is generally semicylindrical in form, said turntable being located near the axis of said hood so that the turntable is partly enclosed by the hood, said hood having a horizontal partition; curved, concentric electrically conducting rails on said partition, a trolley having electrically conductive wheels riding on said rails respectively for traveling in a curved path on said partition, a shaft connecting said trolley and third motor through said partition so that the exhaust fan is movable in another curved horizontal path in the hood, electrical conductors respectively connecting two of the wheels with said third motor via said shaft and connecting two others of said wheels with said fourth motor in the trolley, said electrical conductors being connected in said circuit, and other electrical conductors in said circuit connecting the rails in said circuit for applying electrical voltage thereto to energize the third and fourth motors.

7. Apparatus as recited in claim 6, further comprising a reversing switch and rheostat in circuit with said fourth motor for respectively controlling the direction and speed of travel of the trolley and exhaust fan in said curved paths.

8. Apparatus as recited in claim 7, further comprising other switches connected respectively in series circuit with the motors for selectively turning the same on and off, and another rheostat connected in series circuit with the first motor for controlling the speed of rotation of the turntable.

9. Apparatus as recited in claim 8, further comprising another exhaust fan in said duct cooperating with the first named exhaust fan to exhaust said fumes, said other exhaust fan having a fifth motor connected in series circuit with another switch to said power supply circuit for drawing electrical energy therefrom under control of said other switch.

10. Apparatus as recited in claim 9, wherein said compressor assembly includes a rectangular supporting platform, said spring means comprising springs at corners of the platform connected to the underside of the table.

References Cited

UNITED STATES PATENTS

| | | | |
|---|---|---|---|
| 999,789 | 8/1911 | Hussey | 118—320 X |
| 1,589,956 | 6/1926 | Hageman et al. | 118—319 X |
| 2,110,755 | 3/1938 | Bleakley | 118—319 X |
| 2,481,242 | 9/1949 | Reget | 118—319 X |
| 3,008,834 | 11/1961 | Wallis | 118—20 X |
| 3,106,492 | 10/1963 | MacDonald et al. | 118—24 X |

CHARLES A. WILLMUTH, *Primary Examiner.*

R. I. SMITH, *Assistant Examiner.*